12421166B2

United States Patent
Kikkawa

(10) Patent No.: US 12,421,166 B2
(45) Date of Patent: Sep. 23, 2025

(54) CHEMICALLY STRENGTHENED OPTICAL GLASS

(71) Applicant: OHARA INC., Kanagawa (JP)

(72) Inventor: Saya Kikkawa, Kanagawa (JP)

(73) Assignee: OHARA INC., Kanagawa (JP)

( * ) Notice: Subject to any disclaimer, the term of this patent is extended or adjusted under 35 U.S.C. 154(b) by 267 days.

(21) Appl. No.: 17/920,806

(22) PCT Filed: Mar. 24, 2021

(86) PCT No.: PCT/JP2021/012343
§ 371 (c)(1),
(2) Date: Oct. 24, 2022

(87) PCT Pub. No.: WO2021/215184
PCT Pub. Date: Oct. 28, 2021

(65) Prior Publication Data
US 2023/0167019 A1    Jun. 1, 2023

(30) Foreign Application Priority Data

Apr. 24, 2020 (JP) .................................. 2020-077383

(51) Int. Cl.
| | | |
|---|---|---|
| B32B 15/04 | (2006.01) | |
| B32B 17/06 | (2006.01) | |
| C03C 3/068 | (2006.01) | |
| C03C 21/00 | (2006.01) | |

(52) U.S. Cl.
CPC ............ *C03C 21/002* (2013.01); *C03C 3/068* (2013.01)

(58) Field of Classification Search
USPC ................................................ 428/410, 426
See application file for complete search history.

(56) References Cited

U.S. PATENT DOCUMENTS

| | | | | |
|---|---|---|---|---|
| 4,732,876 A * | 3/1988 | Nagamine | ................ | C03C 3/068 |
| | | | | 501/901 |
| 7,091,145 B2 * | 8/2006 | Wolff | ...................... | C03C 3/068 |
| | | | | 501/78 |
| 8,835,336 B2 * | 9/2014 | Taguchi | ................... | C03C 3/068 |
| | | | | 501/78 |
| 2010/0222199 A1 * | 9/2010 | Wolff | ...................... | C03C 3/068 |
| | | | | 501/78 |
| 2015/0225282 A1 * | 8/2015 | Kuang | .................... | C03C 3/068 |
| | | | | 501/78 |
| 2018/0251395 A1 * | 9/2018 | Akiba | ...................... | C03C 3/068 |
| 2019/0106352 A1 * | 4/2019 | Nojima | ................... | C03C 3/097 |
| 2021/0179479 A1 * | 6/2021 | Amma | ................ | C03C 17/3417 |

FOREIGN PATENT DOCUMENTS

| | | |
|---|---|---|
| CN | 110963701 A | 4/2020 |
| GB | 2342918 A | 4/2000 |
| JP | 61232243 A | 10/1986 |
| JP | 2000128568 A | 5/2000 |
| WO | WO2017090646 A1 | 6/2017 |

OTHER PUBLICATIONS

International Search Report issued on Jun. 1, 2021 for PCT application No. PCT/JP2021/012343.
International Preliminary Report On Patentability issued on Jun. 1, 2021 for PCT application No. PCT/JP2021/012343.
Li Weimin,Zhou Huimin,Liu Hui,Yuan Xiaoqu Editor,"Rare earth glass",China Rare Earth Science and Technology Series,Beijing Metallurgical Industry Press,2016.

* cited by examiner

*Primary Examiner* — Lauren R Colgan
(74) *Attorney, Agent, or Firm* — Li & Cai Intellectual Property Office

(57) ABSTRACT

Provided is a chemically strengthened optical glass with improved crack resistance and high hardness, in which the refractive index and the Abbe number required for a conventional optical glass are maintained. The chemically strengthened optical glass includes a compressive stress layer on a surface, and contains, by mass % in terms of oxide: 2.0 to 20.0% of a $SiO_2$ component, 5.0 to 35.0% of a $B_2O_3$ component, 20.0 to 60.0% of a $La_2O_3$ component, 2.0 to 25.0% of a $TiO_2$ component, 2.0 to 15.0% of a $Nb_2O_5$ component, and more than 0% to 10.0% of a $LiO_2$ component, and the chemically strengthened optical glass is characterized in that an Hv change rate defined as $[(Hv_{after} - Hv_{before})/Hv_{before}] \times 100$ is equal to or greater than 3.0%.

17 Claims, No Drawings

CHEMICALLY STRENGTHENED OPTICAL GLASS

FIELD OF THE DISCLOSURE

The present disclosure relates to a chemically strengthened optical glass having a compressive stress layer on a surface.

BACKGROUND OF THE DISCLOSURE

In recent years, there has been a focus on wearable terminals utilized for artificial reality (AR) and virtual reality (VR), such as eyeglasses having a projector, eyeglass-type displays, goggle-type displays, artificial reality display devices, augmented reality display devices, and virtual image display devices, as well as onboard cameras and the like.

Such wearable terminals and onboard cameras are expected to be used in harsh external environments. Therefore, there is a demand for an optical glass having high hardness and improved impact resistance, wind pressure resistance, scratch resistance, and the like (hereinafter referred to as "crack resistance"), while maintaining a high refractive index, Abbe number, and transmittance required for conventional optical glass. There is also a demand for miniaturization.

Regarding the issues of digitization and definition enhancement of optical equipment, Patent Document 1 discloses a glass having a high refractive index and high dispersion with a refractive index (nd) of 1.64 to 1.83 and an Abbe number (vd) of 36 to 56. However, such a glass is not expected to be used in a harsh external environment, and Patent Document 1 does not disclose an optical glass having high hardness and focusing on crack resistance. In addition, at the time of filing of Patent Document 1, modern state-of-the-art technologies such as VR and AR were not widespread. Moreover, in recent years, another application that has rapidly increased in popularity are onboard cameras, which play a key role in autonomous driving and as "sensors for perimeter recognition" in vehicles to ensure safety. Therefore, an optical glass with improved crack resistance and high hardness was not envisioned at the time of filing of Patent Document 1.

If the optical glass has high strength, it is possible to use a thinner glass for an optical lens, so that the optical lens can be made thinner and smaller.

PRIOR ART DOCUMENT

Patent Document

[Patent Document 1] Japanese Unexamined Patent Application Publication No. 2000-128568

SUMMARY OF THE DISCLOSURE

Accordingly, an object of the present disclosure is to obtain an optical glass with improved crack resistance and high hardness, while maintaining the refractive index and Abbe number required for a conventional optical glass.

In order to solve the above-mentioned problems, the present inventor has conducted intensive experiments and research, and as a result, has developed a glass composition and combination suitable for obtaining a high-hardness optical glass having a high Vickers hardness (Hv) and including a compressive stress layer on a surface formed by chemically strengthening an optical glass, which led to the completion of the present disclosure.

Specifically, the present disclosure provides the following configurations.

(1) A chemically strengthened optical glass including a compressive stress layer on a surface,
the chemically strengthened optical glass comprising, by mass % in terms of oxide:
2.0 to 20.0% of a $SiO_2$ component;
5.0 to 35.0% of a $B_2O_3$ component;
20.0 to 60.0% of a $La_2O_3$ component;
2.0 to 25.0% of a $TiO_2$ component;
2.0 to 15.0% of a $Nb_2O_5$ component; and
more than 0% to 10.0% of a $Li_2O$ component, wherein
an Hv change rate defined as [(Hvafter−Hvbefore)/Hvbefore]×100 is equal to or greater than 3.0%.

(2) The chemically strengthened optical glass according to (1), further comprising: 0 to 15.0% of a $Y_2O_3$ component; and
to 15.0% of a $ZrO_2$ component.

(3) The chemically strengthened optical glass according to (1) or (2), having a value of a mass ratio of $CaO/Li_2O$ of 2.0 or less.

(4) The chemically strengthened optical glass according to any one of (1) to (3), having a value of a mass ratio of $Ln_2O_3/Li_2O$ of 2.0 to 200.0.

(5) The chemically strengthened optical glass according to any one of (1) to (4), having a value of a mass ratio of $TiO_2/Li_2O$ of 0.2 to 40.

(6) The chemically strengthened optical glass according to any one of (1) to (5), having a refractive index (nd) of 1.75 to 2.05 and an Abbe number (vd) of 20.0 to 45.0.

According to the present disclosure, it is possible to provide a chemically strengthened optical glass including a compressive stress layer and having improved crack resistance and high hardness, while maintaining a high refractive index and Abbe number.

DETAILED DESCRIPTION OF THE EXEMPLARY EMBODIMENTS

A composition range of each component included in a chemically strengthened optical glass of the present disclosure is described below. As used herein, all the contents of each component are expressed by mass % with respect to the total mass of an oxide-equivalent composition, unless otherwise specified. Here, the "oxide-equivalent composition" refers to a composition expressing all components contained in a glass, when assuming that all oxides, composite salts, metal fluorides, and the like used as raw materials for the constituent components of the glass of the present disclosure are decomposed and transformed into oxides during melting, and the total mass number of the produced oxides is 100 mass %.

[Glass Components]

The chemically strengthened optical glass of the present disclosure includes a compressive stress layer on a surface, and contains, by mass % in terms of oxide: 2.0 to 20.0% of a $SiO_2$ component, 5.0 to 35.0% of a $B_2O_3$ component, 20.0 to 60.0% of a $La_2O_3$ component, 2.0 to 25.0% of a $TiO_2$ component, 2.0 to 15.0% of a $Nb_2O_5$ component, and more than 0% to 10.0% of a $LiO_2$ component, and the chemically strengthened optical glass is characterized in that an Hv change rate defined as [(Hvafter−Hvbefore)/Hvbefore]×100 is equal to or greater than 3.0%.

[Essential Components and Optional Components]

The $SiO_2$ component is a component forming a network structure of the glass, is a component that reduces devitrification (generation of crystals), which is undesirable in an optical glass, and is an essential component of the chemically strengthened optical glass of the present disclosure.

In particular, if the content of the $SiO_2$ component is set to 2.0% or more, it is possible to produce a stable optical glass.

Therefore, the lower limit of the content of the $SiO_2$ component is preferably 2.0% or more, more preferably 2.5% or more, still more preferably 3.0% or more, even more preferably 3.5% or more, still even more preferably 4.0% or more, and further more preferably 4.5% or more.

On the other hand, if the content of the $SiO_2$ component is set to 20.0% or less, it is possible to suppress an excessive increase in viscosity, a deterioration of the meltability, and a decrease of the refractive index.

Therefore, an upper limit of the content of the $SiO_2$ component is preferably 20.0% or less, more preferably 15.0% or less, still more preferably 12.0% or less, and even more preferably 10.0% or less.

The $B_2O_3$ component is a component forming a network structure of the glass, is a component that reduces devitrification (generation of crystals), which is undesirable in an optical glass, and is an essential component of the chemically strengthened optical glass of the present disclosure.

In particular, if the content of the $B_2O_3$ component is set to 5.0% or more, it is possible to promote stable glass formation and increase the devitrification resistance.

Therefore, a lower limit of the content of the $B_2O_3$ component is preferably 5.0% or more, more preferably 8.0% or more, and still more preferably 10.0% or more.

On the other hand, if the content of the $B_2O_3$ component is set to 35.0% or less, it is possible to suppress a decrease of the refractive index.

Thus, an upper limit of the content of the $B_2O_3$ component is preferably 35.0% or less, more preferably 33.0% or less, and still more preferably 30.0% or less.

The $La_2O_3$ component is a component that may improve the refractive index, and is an essential component of the chemically strengthened optical glass of the present disclosure.

In particular, if the content of the $La_2O_3$ component is set to 20.0% or more, a desired refractive index of the glass can be achieved.

Therefore, a lower limit of the content of the $La_2O_3$ component is preferably 20.0% or more, more preferably 25.0% or more, and still more preferably 30.0% or more.

On the other hand, if the content of the $La_2O_3$ component is set to 60.0% or less, it is possible to reduce a deterioration of the devitrification due to an excessive addition of the $La_2O_3$ component.

Thus, an upper limit of the content of the $La_2O_3$ component is preferably 60.0% or less, more preferably 55.0% or less, and still more preferably 53.0% or less.

The $TiO_2$ component is a component that increases the refractive index and the chemical durability (acid resistance), and is an essential component of the chemically strengthened optical glass of the present disclosure.

In particular, if the content of the $TiO_2$ component is set to 2.0% or more, a desired refractive index, Abbe number, and the like of the glass can be achieved.

Therefore, a lower limit of the content of the $TiO_2$ component is preferably 2.0% or more, more preferably 2.5% or more, and still more preferably 3.0% or more.

On the other hand, if the content of the $TiO_2$ component is set to 25.0% or less, it is possible to suppress a decrease in the transmittance of the glass with respect to visible light (in particular, light having a wavelength of 500 nm or less).

Therefore, an upper limit of the content of the $TiO_2$ component is preferably 25.0% or less, more preferably 23.0% or less, still more preferably 20.0% or less, and even more preferably 18.0% or less.

A $Nb_2O_5$ component is a component that increases the refractive index and stabilizes the glass, and is an essential component of the chemically strengthened optical glass of the present disclosure.

In particular, if the content of the $Nb_2O_5$ component is set to 2.0% or more, it is possible to increase the devitrification resistance.

Therefore, a lower limit of the content of the $Nb_2O_5$ component is preferably 2.0% or more, more preferably 2.5% or more, still more preferably 3.0% or more, and even more preferably 3.5% or more.

On the other hand, if the content of the $Nb_2O_5$ component is set to 15.0% or less, it is possible to reduce devitrification due to an excessive content of the $Nb_2O_5$ component.

Thus, an upper limit of the content of the $Nb_2O_5$ component is preferably 15.0% or less, more preferably 13.0% or less, and still more preferably 11.0% or less.

If the content of the $Li_2O$ component is more than 0%, the $Li_2O$ component is a component that improves the meltability of the glass, is a component utilized for an ion exchange in chemical strengthening, as described later, and is an essential component in the chemically strengthened optical glass of the present disclosure.

In particular, if the content of the $Li_2O$ component is set to more than 0%, an exchange reaction proceeds between a sodium component (sodium ions) having a large ionic radius in a molten salt and a lithium component (lithium ions) having a small ionic radius in a substrate, and as a result, compressive stress is produced on a surface of the substrate.

Therefore, a lower limit of the content of the $Li_2O$ component is preferably more than 0%, more preferably 0.1% or more, and still more preferably 0.2% or more.

On the other hand, if the content of the $Li_2O$ component is set to 10.0% or less, it is possible to suppress a decrease of the refractive index and suppress a deterioration of the devitrification due to an excessive content of the $Li_2O$ component.

Therefore, an upper limit of the content of the $Li_2O$ component is preferably 10.0% or less, more preferably 8.0% or less, still more preferably 6.0% or less, and even more preferably 4.1% or less.

If the content of a $Y_2O_3$ component is more than 0%, the $Y_2O_3$ component is a component that may improve the refractive index, and is an optional component in the chemically strengthened optical glass of the present disclosure.

Therefore, a lower limit of the content of the $Y_2O_3$ component is preferably more than 0%, more preferably 1.0% or more, still more preferably 2.0% or more, even more preferably 2.5% or more, and still even more preferably 3.0% or more.

On the other hand, if the content of the $Y_2O_3$ component is set to 15.0% or less, it is possible to reduce devitrification due to an excessive content of the $Y_2O_3$ component.

Thus, an upper limit of the content of the $Y_2O_3$ component is preferably 15.0% or less, more preferably 13.0% or less, and still more preferably 11.0% or less.

If the content of a $ZrO_2$ component is more than 0%, the $ZrO_2$ component is a component that increases the refractive index of the glass, and is an optional component in the chemically strengthened optical glass of the present disclosure.

Therefore, a lower limit of the content of the $ZrO_2$ component is preferably more than 0%, more preferably 1.0% or more, still more preferably 2.0% or more, even more preferably 2.5% or more, and still even more preferably 3.0% or more.

If the content of the $ZrO_2$ component is set to 15.0% or less, it is possible to reduce the devitrification due to an excessive content of the $ZrO_2$ component.

Therefore, an upper limit of the content of the $ZrO_2$ component is preferably 15.0% or less, more preferably 13.0% or less, still more preferably 10.0% or less, even more preferably 8.0% or less, and still even more preferably 7.0% or less.

If the content of a $Na_2O$ component is more than 0%, the $Na_2O$ component is a component that adjusts the refractive index and the Abbe number while adjusting the meltability of the glass, and is also a component that may improve the surface compressive stress of the glass in the chemical strengthening.

Therefore, a lower limit of the content of the $Na_2O$ component is preferably more than 0%, and more preferably 0.05% or more.

On the other hand, if the content of the $Na_2O$ component is set to 10.0% or less, the refractive index of the glass is unlikely to decrease and the devitrification of the glass can be reduced.

Thus, an upper limit of the content of the $Na_2O$ component is preferably 10.0% or less, more preferably 5.0% or less, and still more preferably 3.0% or less.

If the content of a $K_2O$ component is more than 0%, the $K_2O$ component is a component that adjusts the refractive index and the Abbe number while adjusting the meltability of the glass, and is an optional component that may improve the surface compressive stress of the glass in the chemical strengthening.

Therefore, a lower limit of the content of the $K_2O$ component is preferably more than 0%, more preferably 0.1% or more, still more preferably 0.3% or more, and even more preferably 0.4% or more.

On the other hand, if the content of the $K_2O$ component is set to 5.0% or less, the refractive index of the glass is unlikely to decrease and the devitrification of the glass can be reduced.

Therefore, an upper limit of the content of the $K_2O$ component is preferably 5.0% or less, more preferably 4.0% or less, still more preferably 3.0% or less, and even more preferably 2.0% or less.

If each content of a MgO component, a CaO component, a SrO component, and a BaO component is more than 0%, these components are components that increase the refractive index of the glass, and are optional components in the chemically strengthened optical glass of the present disclosure.

Therefore, a lower limit of each content of the MgO component, the CaO component, the SrO component, and the BaO component is preferably more than 0%, more preferably 0.1% or more, still more preferably 0.5% or more, and even more preferably 1.0% or more.

On the other hand, if each content of the MgO component, the CaO component, the SrO component, and the BaO component is set to 10.0% or less, it is possible to suppress a decrease in hardness due to a salt bath during chemical strengthening.

Therefore, an upper limit of each content of the MgO component, the CaO component, the SrO component, and the BaO component is preferably 10.0% or less, more preferably 8.0% or less, and still more preferably 5.0% or less.

If the content of a ZnO component is more than 0%, the ZnO component is a component that increases the refractive index of the glass, and is an optional component in the chemically strengthened optical glass of the present disclosure.

Therefore, a lower limit of the content of the ZnO component is preferably more than 0%, more preferably 0.5% or more, and still more preferably 1.0% or more.

On the other hand, if the content of the ZnO component is set to 10.0% or less, it is possible to suppress a decrease in hardness due to a salt bath during chemical strengthening.

Therefore, an upper limit of the content of the ZrO component is preferably 10.0% or less, more preferably 8.0% or less, and still more preferably 6.0% or less.

If the content of an $Al_2O_3$ component is more than 0%, the $Al_2O_3$ component is an effective component for increasing the chemical durability of the glass and improving the devitrification resistance of a molten glass, and is an optional component in the chemically strengthened optical glass of the present disclosure.

Therefore, a lower limit of the content of the $Al_2O_3$ component is preferably more than 0%, more preferably 0.5% or more, and still more preferably 1.0% or more.

On the other hand, if the content of the $Al_2O_3$ component is set to 5.0% or less, it is possible to reduce devitrification due to an excessive content of the $Al_2O_3$ component.

Therefore, an upper limit of the content of the $Al_2O_3$ component is preferably 5.0% or less, more preferably 4.0% or less, still more preferably 3.0% or less, and even more preferably 2.0% or less.

A $WO_3$ component is an optional component that may increase the refractive index, decrease the Abbe number, and enhance the meltability of the glass raw material.

Therefore, a lower limit of the content of the $WO_3$ component is preferably more than 0%, and more preferably 0.5% or more.

On the other hand, if the content of the $WO_3$ component is set to 10.0% or less, it is possible to prevent an increase of the partial dispersion ratio of the glass and reduce the coloring of the glass to increase the internal transmittance.

Therefore, an upper limit of the content of the $WO_3$ component is preferably 10.0% or less, more preferably 5.0% or less, and still more preferably 3.0% or less.

An $Sb_2O_3$ component is an optional component capable of degassing the molten glass, if the content of the $Sb_2O_3$ component is more than 0%.

Therefore, a lower limit of the content of the $Sb_2O_3$ component is preferably more than 0%, more preferably 0.03% or more, and still more preferably 0.05% or more.

On the other hand, if the content of the $Sb_2O_3$ component is set to less than 1.0%, it is possible to suppress a decrease of the transmittance in a short wavelength region of the visible light region, solarization of the glass, and a deterioration of internal quality.

Therefore, the content of the $Sb_2O_3$ component may be preferably less than 1.0%, more preferably 0.5% or less, and still more preferably 0.3% or less.

If the sum of the contents of RO components (R being one or more types selected from the group consisting of Mg, Ca, Sr, and Ba) is more than 0%, it is possible to improve the meltability at low temperatures.

Therefore, a lower limit of the sum of the contents of the RO components is preferably more than 0%, more preferably 0.1% or more, and still more preferably 0.3% or more.

On the other hand, the sum of the contents of the RO components is preferably 20.0% or less, in order to suppress deterioration of the devitrification resistance due to an excessive content of the RO components and to suppress a decrease in hardness due to a salt bath during chemical strengthening.

Therefore, an upper limit of the sum of the contents of the RO components is preferably 20.0% or less, more preferably 15.0% or less, still more preferably 10.0% or less, even more preferably 8.0% or less, and still even more preferably 5.0% or less.

A $Gd_2O_3$ component and a $Yb_2O_3$ component are optional components that may increase the refractive index and reduce the partial dispersion ratio, if the content of at least one of these components is more than 0%.

Therefore, a lower limit of each content of the $Gd_2O_3$ component and the $Yb_2O_3$ component is preferably more than 0%, and more preferably 1.0% or more.

On the other hand, if the $Gd_2O_3$ component and the $Yb_2O_3$ component are contained in a large amount, the liquidus temperature is lowered and the glass is devitrified.

In particular, if each content of the $Gd_2O_3$ component and the $Y_2O_3$ component is set to 15.0% or less, it is possible to reduce devitrification and coloring of the glass.

Therefore, an upper limit of each content of the $Gd_2O_3$ component and the $Yb_2O_3$ component is preferably 15.0% or less, more preferably 10.0% or less, still more preferably 8.0% or less, even more preferably 5.0% or less, and most preferably 3.0% or less.

A $P_2O_5$ component is an optional component that can improve the stability of the glass.

Therefore, a lower limit of the content of the $P_2O_5$ component is preferably more than 0%, and more preferably 0.5% or more.

On the other hand, if the content of the $P_2O_5$ component is set to 5.0% or less, it is possible to reduce an increase of the partial dispersion ratio due to an excessive content of the $P_2O_5$ component.

Therefore, an upper limit of the content of the $P_2O_5$ component is preferably 5.0% or less, more preferably 3.0% or less, and still more preferably 1.0% or less.

A $Ta_2O_5$ component is an optional component that may increase the refractive index, decrease the Abbe number and the partial dispersion ratio, and increase the devitrification resistance.

In particular, if the content of the $Ta_2O_5$ component is set to 10.0% or less, the usage amount of the $Ta_2O_5$ component, which is a rare mineral resource, is reduced, and the glass melts more easily at a lower temperature. Thus, it is possible to reduce the production cost of the glass. In addition, it is possible to reduce devitrification of the glass due to an excessive content of the $Ta_2O_5$ component.

Therefore, an upper limit of the content of the $Ta_2O_5$ component is preferably 10.0% or less, more preferably 5.0% or less, still more preferably 3.0% or less, and even more preferably 1.0% or less. In particular, from the viewpoint of reducing the material cost of the glass, the $Ta_2O_5$ component may not be contained.

A $GeO_2$ component is an optional component that may increase the refractive index and reduce devitrification. If the content of the $GeO_2$ component is set to 10.0% or less, the usage amount of the expensive $GeO_2$ component is reduced, and thus, it is possible to reduce the material cost of the glass.

Therefore, an upper limit of the content of the $GeO_2$ component is preferably 10.0% or less, more preferably 5.0% or less, still more preferably 3.0% or less, and even more preferably 1.0% or less.

A $Ga_2O_3$ component is an optional component that may increase the refractive index and improve the devitrification resistance.

On the other hand, if the content of the $Ga_2O_3$ component is set to 10.0% or less, it is possible to reduce devitrification due to an excessive content of the $Ga_2O_3$ component.

Therefore, an upper limit of the content of the $Ga_2O_3$ component is preferably 10.0% or less, more preferably 5.0% or less, still more preferably 3.0% or less, and even more preferably 1.0% or less.

A $Bi_2O_3$ component is an optional component that may increase the refractive index, decrease the Abbe number, and lower the glass transition temperature. If the content of the $Bi_2O_3$ component is set to 10.0% or less, it is possible to prevent an increase of the partial dispersion ratio and reduce the coloring of the glass to increase the internal transmittance.

Therefore, an upper limit of the content of the $Bi_2O_3$ component is preferably 10.0% or less, more preferably 5.0% or less, still more preferably 3.0% or less, and even more preferably 1.0% or less.

A $TeO_2$ component is an optional component that may increase the refractive index, lower the partial dispersion ratio, and lower the glass transition temperature. If the content of the $TeO_2$ component is set to 10.0% or less, it is possible to reduce the coloring of the glass to increase the internal transmittance. If the use of the expensive $TeO_2$ component is reduced, it is possible to obtain a glass with a lower material cost.

Therefore, an upper limit of the content of the $TeO_2$ component is preferably 10.0% or less, more preferably 5.0% or less, still more preferably 3.0% or less, and even more preferably 1.0% or less. In particular, from the viewpoint of reducing the material cost of the glass, the $TeO_2$ component may not be contained.

An $SnO_2$ component is an optional component capable of clarifying (degassing) a molten glass and increasing the transmittance of the glass for visible light. If the content of the $SnO_2$ component is set to 1.0% or less, it is possible to prevent coloring of the glass due to a reduction reaction in the molten glass, and devitrification of the glass. In addition, it is possible to suppress the formation of alloys between the $SnO_2$ component and equipment for the melting process (in particular, precious metals such as Pt), and thus, the life span of the equipment for the melting process can be increased.

Therefore, an upper limit of the content of the $SnO_2$ component is preferably 1.0% or less, more preferably 0.5% or less, and still more preferably 0.1% or less.

If the sum of the contents (mass sum) of $Rn_2O$ components (Rn being one or more types selected from the group consisting of Li, Na, and K) is more than 0%, it is possible to improve the meltability of the glass.

Therefore, a lower limit of the sum of the $Rn_2O$ components is preferably more than 0%, more preferably 0.1% or more, still more preferably more than 0.3%, and even more preferably 0.5% or more.

On the other hand, if the sum of the contents (mass sum) of the $Rn_2O$ components is set to 20.0% or less, it is possible to suppress a decrease of the refractive index and reduce the devitrification due to an excessive content of the $Rn_2O$ components.

Therefore, an upper limit of the sum of the contents of the $Rn_2O$ components is preferably 20.0% or less, more preferably 15.0% or less, still more preferably 10.0% or less, and even more preferably 8.0% or less.

If the sum of the contents (mass sum) of $Ln_2O_3$ components (Ln being one or more types selected from the group consisting of La, Y, Gd, and Yb) is 20.0% or more, it is possible to more easily obtain a high refractive index. Therefore, a lower limit of the sum of the $Ln_2O_3$ components is preferably 20.0% or more, more preferably 30.0% or more, and still more preferably 40.0% or more.

On the other hand, if the sum of the contents (mass sum) of the $Ln_2O_3$ components is set to 70.0% or less, it is possible to reduce devitrification due to an excessive content of the $Ln_2O_3$ components.

Therefore, an upper limit of the sum of the contents of the $Ln_2O_3$ components is preferably 70.0% or less, more preferably 68.0% or less, still more preferably 65.0% or less, and even more preferably 60.0% or less.

If the mass ratio $CaO/Li_2O$ is set to 2.0 or less, it is possible to suppress a decrease in hardness due to a salt bath during chemical strengthening.

Therefore, an upper limit of the mass ratio $CaO/Li_2O$ is preferably 2.0 or less, more preferably 1.8 or less, still more preferably 1.5 or less, and even more preferably 1.2 or less.

In particular, from the viewpoint of chemical strengthening, it is desirable to set the mass ratio $CaO/Li_2O$ to 0 in order to prevent the surface from being roughened due to the salt bath.

If the mass ratio $Ln_2O_3/Li_2O$ is set to 2.0 or more, it is possible to easily obtain a high refractive index.

Therefore, a lower limit of the mass ratio $Ln_2O_3/Li_2O$ is preferably 2.0 or more, more preferably 2.0 or more, and still more preferably 10.0 or more.

On the other hand, if the mass ratio $Ln_2O_3/Li_2O$ is set to 200 or less, it is possible to prevent a deterioration of the devitrification properties due to an excessive addition of the components.

Therefore, an upper limit of the mass ratio $Ln_2O_3/Li_2O$ is preferably 200 or less, more preferably 195 or less, and even more preferably 190 or less.

In particular, from the viewpoint of chemical strengthening, it is desirable that the mass ratio $Ln_2O_3/Li_2O$ is less than 189 because the hardness easily increases due to the chemical strengthening.

When the mass ratio $TiO_2/Li_2O$ is set to 0.2 or more, it is possible to easily obtain a desired refractive index and Abbe number.

Therefore, a lower limit of the mass ratio $TiO_2/Li_2O$ is preferably 0.2 or more, more preferably 0.5 or more, and still more preferably 1.0 or more.

On the other hand, if the mass ratio $TiO_2/Li_2O$ is set to 40 or less, it is possible to prevent a deterioration of the devitrification properties due to an excessive addition of the components.

Therefore, an upper limit of the mass ratio $TiO_2/Li_2O$ is preferably 40 or less, more preferably 35 or less, and still more preferably 33 or less.

In particular, from the viewpoint of chemical strengthening, it is desirable that the mass ratio $TiO_2/Li_2O$ is 30 or less because the hardness easily increases due to the chemical strengthening.

[Manufacturing Method]

The chemically strengthened optical glass of the present disclosure is manufactured as described below, for example. That is, raw materials such as oxides, carbonates, nitrates, and hydroxides are uniformly mixed so that the content of each component is within a predetermined content range. Next, the produced mixture is placed into a platinum crucible and melted in an electric furnace in a temperature range from 1200° C. to 1500° C. for one to four hours depending on the difficulty of melting the glass composition. Subsequently, the molten mixture is stirred and homogenized, and then, cooled to an appropriate temperature and casted into a mold. The mold is slowly cooled to manufacture the optical glass. Finally, the manufactured glass is chemically strengthened.

[Chemical Strengthening]

A method of chemically strengthening a glass is a method of strengthening a surface of the glass, which is called a chemical strengthening method, an ion exchange strengthening method, or the like. In the chemically strengthened optical glass according to the present disclosure, the surface of the glass is subjected to an ion exchange treatment to form a surface layer (compressive stress layer) in which compressive stress remains, and thus, the glass surface is strengthened. The ion exchange is generally performed at a temperature equal to or lower than the glass transition temperature. In the ion exchange, alkali metal ions having a small ionic radius (typically lithium ions and sodium ions) on the glass surface are substituted with alkali ions having a larger ionic radius (typically, sodium ions or potassium ions for lithium ions, and potassium ions for sodium ions). Thus, compressive stress remains on the surface of the glass, which improves the strength of the glass.

The chemical strengthening method may be implemented according to the following steps, for example. A glass base material is contacted to or immersed in a molten salt of a salt containing potassium or sodium, for example, potassium nitrate (KNO3), sodium nitrate (NaNO3) or a mixed salt or a complex salt thereof. The treatment of contacting or immersing the glass base material to or in the molten salt (chemical strengthening treatment) may be performed in one stage or in two stages.

For example, in the case of the two-stage chemical strengthening treatment, firstly, the glass base material is contacted to or immersed in a sodium salt or a mixed salt of potassium and sodium heated at 370° C. to 550° C. for 1 to 1440 minutes, preferably 90 to 800 minutes. Subsequently, secondly, the resultant glass base material is contacted to or immersed in a potassium salt or a mixed salt of potassium and sodium heated at 350° C. to 550° C. for 1 to 1440 minutes, preferably 60 to 800 minutes.

In the case of the one-stage chemical strengthening treatment, the glass base material is contacted to or immersed in a salt containing potassium or sodium or a mixed salt thereof heated at 370° C. to 550° C. for 1 to 1440 minutes, preferably 60 to 800 minutes.

The heat strengthening method is not particularly limited, but, for example, the glass base material may be heated to 300° C. to 600° C., and then, be subjected to rapid cooling such as water cooling and/or air cooling to form the compressive stress layer by a temperature difference between the surface and the inside of the glass substrate. When the heat strengthening method is combined with the above chemical treatment method, it is possible to more effectively form the compressive stress layer.

The ion implantation method is not particularly limited, but, for example, any type of ion may be caused to collide with the surface of the glass base material with an acceleration energy and an acceleration voltage that do not destroy the surface of the base material, to implant the ions into the surface of the base material. Thereafter, by performing heat treatment as necessary, it is possible to form the compressive stress layer on the surface in a similar manner as in the other methods.

[Refractive Index and Abbe Number]

The chemically strengthened optical glass of the present disclosure preferably has a high refractive index. In particular, a lower limit of the refractive index (nd) of the chemically strengthened optical glass of the present disclosure is preferably 1.75 or more, more preferably 1.78 or more, and still more preferably 1.79 or more.

On the other hand, an upper limit of the refractive index is preferably 2.05 or less, more preferably 2.00 or less, still more preferably 1.95 or less, and even more preferably 1.90 or less.

A lower limit of the Abbe number (vd) of the chemically strengthened optical glass of the present disclosure is preferably 20.0 or more, more preferably 22.0 or more, and still more preferably 25.0 or more. On the other hand, an upper limit of the Abbe number is preferably 45.0 or less, more preferably 40.0 or less, and still more preferably 39.0 or less.

[Specific Gravity]

From the viewpoint of contributing to the weight reduction of optical elements and optical equipment, an upper limit of the specific gravity of the chemically strengthened optical glass of the present disclosure is preferably 5.00 or less, more preferably 4.85 or less, still more preferably 4.50 or less, and even more preferably 4.30 or less.

On the other hand, in many cases, the specific gravity of the optical glass of the present disclosure is often generally 2.00 or higher, more specifically 2.50 or higher, and still more specifically 3.00 or higher.

[Vickers Hardness]

The hardness of the chemically strengthened optical glass of the present disclosure is confirmed by the Vickers hardness (Hv). It is known that the Vickers hardness correlates with the scratch resistance, and thus, the scratch resistance of the present disclosure is expressed by the Vickers hardness (Hv). That is, if the Hv change rate represented by the following formula is set to 3.0% or more, it is possible to provide a chemically strengthened optical glass with improved crack resistance.

Hv change rate: $[(Hv\text{after}-Hv\text{before})/Hv\text{before}]\times 100$

In the above formula, Hvafter is the Vickers hardness of the optical glass after chemical strengthening, and Hvbefore is the Vickers hardness of the optical glass before chemical strengthening.

The Hv change rate of the chemically strengthened optical glass of the present disclosure expressed by the following formula may be 3.0% or more, preferably 3.5% or more, more preferably 4.0% or more, still more preferably 5.0% or more, even more preferably 5.5% or more, still even more preferably 6.0% or more, further more preferably 6.5% or more, and still further more preferably 7.0% or more. Thus, the chemically strengthened optical glass exhibits better crack resistance than the optical glass before the chemical strengthening.

EXAMPLES

The following examples describe the present disclosure in detail for illustrative purposes. However, it should be noted that these examples are for illustrative purposes only and that various modifications may be made by those skilled in the art without departing from the gist and scope of the present disclosure.

In Examples (No. 1 to No. 25) and Comparative Example 1, glass having various compositions as listed in Tables 1 to 4 was manufactured. These glasses were obtained by the following procedure. High-purity raw materials used in ordinary chemically strengthened optical glass, including oxides, hydroxides, carbonates, nitrates, fluorides, and metaphosphate compounds, were selected as raw materials corresponding to raw materials of each composition. The raw materials were weighted and mixed to obtain a composition ratio of each of the Examples shown in Tables 1 to 4. Next, the mixed raw materials were transferred into a platinum crucible, melted in an electric furnace in a temperature range from 1200° C. to 1400° C. for one to four hours, depending on the difficulty of melting the glass composition, and the molten material was stirred and homogenized. Subsequently, the temperature was lowered to an appropriate temperature, the homogenized material was cast into a mold or the like and slowly cooled. Tables 1 to 4 show measurement results of the refractive index (nd) and the Abbe number (vd) for each of these glasses.

The refractive index (nd) and Abbe number (vd) of glass are indicated by a measurement value for a helium lamp d line (587.56 nm) according to the V block method specified in JIS B 7071-2: 2018. The Abbe number (vd) is calculated by the formula Abbe number $(vd)=[(nd-1)/(nF-nC)]$, by using the refractive index for the d-line mentioned above, and values of the refractive index (nF) for the F-line (486.13 nm) and the refractive index (nC) for the C-line (656.27 nm) of a hydrogen lamp.

Here, the refractive index (nd) and the Abbe number (vd) were determined by measuring a glass obtained at a slow cooling rate of −25° C./hr.

Subsequently, the glass was immersed in potassium nitrate (KNO3) (K bath) or sodium nitrate (NaNO3) (Na bath) at the temperatures and during the time periods listed in Tables 1 to 4. Tables 1 to 4 show the results of calculating the Hv change rate for each of these glasses.

The specific gravity p of the glass of Examples and Comparative Examples was measured based on Japan Optical Glass Manufacturers' Association JIS Z8807:2012 "Method of measuring specific gravity of optical glass".

The Vickers hardness of the glass was determined by pushing the glass using a 136 degrees pyramidal diamond indenter with a load of 980.7 mN for 10 seconds and dividing the load at which indentation was observed on the test surface by the surface area (mm2) calculated from the diagonal length of the depression of the indentation. The measurement was performed using a micro Vickers hardness tester HMV-G21D manufactured by Shimadzu Corporation.

TABLE 1

| wt % | Example | | | | | | | |
| --- | --- | --- | --- | --- | --- | --- | --- | --- |
| | 1 | 2 | 3 | 4 | 5 | 6 | 7 | 8 |
| $SiO_2$ | 5.79 | 5.79 | 5.79 | 5.79 | 5.84 | 8.42 | 5.77 | 5.61 |
| $B_2O_3$ | 10.74 | 22.73 | 21.73 | 21.73 | 20.12 | 17.24 | 21.65 | 21.03 |
| $La_2O_3$ | 47.98 | 37.99 | 37.99 | 37.99 | 38.27 | 38.43 | 37.85 | 36.76 |
| $TiO_2$ | 9.38 | 9.38 | 9.38 | 9.38 | 9.45 | 9.49 | 9.35 | 9.08 |
| $Nb_2O_5$ | 7.54 | 7.54 | 7.54 | 7.54 | 7.60 | 7.63 | 7.51 | 10.55 |

TABLE 1-continued

| wt % | Example 1 | 2 | 3 | 4 | 5 | 6 | 7 | 8 |
|---|---|---|---|---|---|---|---|---|
| $Li_2O$ | 1.10 | 1.60 | 2.10 | 2.10 | 2.62 | 2.63 | 2.47 | 2.03 |
| $Y_2O_3$ | 9.82 | 7.82 | 7.82 | 7.82 | 7.89 | 7.92 | 7.80 | 7.57 |
| $ZrO_2$ | 5.79 | 5.79 | 5.79 | 5.79 | 5.84 | 5.87 | 5.78 | 5.61 |
| $Na_2O$ | 1.00 | 0.50 | 1.00 | 0.50 | 1.53 | 1.54 | 0.99 | 0.96 |
| $K_2O$ | | | | 0.50 | | | | |
| MgO | | | | | | | | |
| BaO | | | | | | | | |
| ZnO | | | | | | | | |
| $Al_2O_3$ | | | | | | | | |
| $WO_3$ | 0.75 | 0.75 | 0.75 | 0.75 | 0.75 | 0.75 | 0.74 | 0.72 |
| $Sb_2O_3$ | 0.10 | 0.10 | 0.10 | 0.10 | 0.09 | 0.09 | 0.09 | 0.086 |
| TOTAL | 100.00 | 100.00 | 100.00 | 100.00 | 100.00 | 100.00 | 100.00 | 100.000 |
| $Ln_2O_3$ | 57.80 | 45.81 | 45.81 | 45.81 | 46.16 | 46.35 | 45.65 | 44.33 |
| $Rn_2O$ | 2.10 | 2.10 | 3.10 | 3.10 | 4.15 | 4.17 | 3.46 | 3.00 |
| $CaO/Li_2O$ | 0.00 | 0.00 | 0.00 | 0.00 | 0.00 | 0.00 | 0.00 | 0.00 |
| $Ln_2O_3/Li_2O$ | 52.60 | 28.66 | 21.84 | 21.84 | 17.61 | 17.61 | 18.50 | 21.83 |
| $TiO_2/Li_2O$ | 8.54 | 5.87 | 4.47 | 4.47 | 3.60 | 3.60 | 3.79 | 4.47 |
| Refractive index(nd) | 1.930 | 1.848 | 1.847 | 1.847 | 1.849 | 1.850 | 1.845 | 1.859 |
| Abbe number(vd) | 32.58 | 34.46 | 34.60 | 34.56 | 34.37 | 34.28 | 34.60 | 33.44 |
| Specific gravity(ρ) | 4.75 | 4.13 | 4.13 | 4.12 | 4.14 | 4.15 | 4.10 | 4.14 |
| Hv(before) | 801 | 821 | 823 | 813 | 785 | 779 | 799 | 799 |
| Hv(after) | 832 | 858 | 851 | 847 | 830 | 822 | 830 | 830 |
| Hv change rate(%) | 3.9 | 4.5 | 3.4 | 4.2 | 5.6 | 5.5 | 3.9 | 3.9 |
| Chemical strengthening conditons | Na bath 450° C. 24 h → K bath 450° C. 24 h | Na bath 480° C. 6 h → K bath 480° C. 6 h | Na bath 450° C. 24 h → K bath 450° C. 24 h | Na bath 450° C. 24 h → K bath 450° C. 24 h | Na bath 450° C. 2 h → K bath 450° C. 6 h | Na bath 450° C. 2 h → K bath 450° C. 6 h | Na bath 480° C. 6 h → K bath 480° C. 6 h | Na bath 480° C. 6 h → K bath 480° C. 6 h |

TABLE 2

| wt % | Example 9 | 10 | 11 | 12 | 13 | 14 | 15 | 16 |
|---|---|---|---|---|---|---|---|---|
| $SiO_2$ | 5.77 | 5.68 | 5.79 | 5.80 | 7.82 | 9.32 | 6.80 | 5.61 |
| $B_2O_3$ | 21.66 | 21.31 | 29.72 | 23.75 | 18.20 | 15.20 | 17.43 | 19.53 |
| $La_2O_3$ | 37.87 | 37.26 | 31.00 | 38.03 | 47.00 | 45.00 | 42.28 | 40.76 |
| $TiO_2$ | 9.35 | 9.20 | 9.38 | 13.39 | 4.36 | 3.36 | 3.58 | 9.08 |
| $Nb_2O_5$ | 7.52 | 7.40 | 3.55 | 7.55 | 8.01 | 7.01 | 7.08 | 10.55 |
| $Li_2O$ | 2.09 | 2.06 | 1.10 | 2.10 | 1.00 | 2.00 | 0.30 | 4.03 |
| $Y_2O_3$ | 7.80 | 7.68 | 9.82 | 3.83 | 6.09 | 10.09 | 8.00 | 3.57 |
| $ZrO_2$ | 5.78 | 5.69 | 6.29 | 3.80 | | 5.08 | 5.17 | 5.61 |
| $Na_2O$ | 0.99 | 0.98 | 0.50 | 1.00 | | | 0.10 | 0.46 |
| $K_2O$ | | | | | 0.50 | 1.00 | 0.10 | |
| MgO | 0.34 | 0.67 | | | | | 4.83 | |
| BaO | | | | 0.70 | | | 2.00 | |
| ZnO | | | | | 5.57 | 1.08 | | |
| $Al_2O_3$ | | 1.26 | | | | | | |
| $WO_3$ | 0.74 | 0.73 | 2.75 | | 0.75 | 0.75 | 2.23 | 0.72 |
| $Sb_2O_3$ | 0.09 | 0.09 | 0.10 | 0.05 | 0.19 | 0.10 | 0.10 | 0.09 |
| TOTAL | 100.00 | 100.00 | 100.00 | 100.00 | 100.00 | 100.00 | 100.00 | 100.00 |
| $Ln_2O_3$ | 45.67 | 44.94 | 40.82 | 41.86 | 53.10 | 55.09 | 50.28 | 44.33 |
| $Rn_2O$ | 3.09 | 3.04 | 1.60 | 3.10 | 2.00 | 3.00 | 0.50 | 4.50 |
| $CaO/Li_2O$ | 0.00 | 0.00 | 0.00 | 0.00 | 0.00 | 0.00 | 0.00 | 0.00 |
| $Ln_2O_3/Li_2O$ | 21.83 | 21.83 | 37.15 | 19.93 | 53.15 | 27.58 | 167.77 | 11.00 |
| $TiO_2/Li_2O$ | 4.47 | 4.47 | 8.54 | 6.38 | 4.36 | 1.68 | 11.93 | 2.25 |
| Refractive index(nd) | 1.846 | 1.840 | 1.798 | 1.852 | 1.828 | 1.832 | 1.835 | 1.860 |
| Abbe number(vd) | 34.60 | 34.90 | 36.50 | 32.11 | 38.76 | 39.60 | 39.08 | 33.59 |
| Specific gravity(ρ) | 4.13 | 4.08 | 3.84 | 3.99 | 4.39 | 4.40 | 4.40 | 4.13 |
| Hv(before) | 796 | 789 | 809 | 789 | 754 | 769 | 789 | 766 |
| Hv(after) | 833 | 823 | 844 | 823 | 781 | 802 | 816 | 805 |
| Hv change rate(%) | 4.7 | 4.2 | 4.4 | 4.3 | 3.7 | 4.2 | 3.4 | 5.1 |
| Chemical strengthening conditons | Na bath 480° C. 6 h → K bath | Na bath 470° C. 6 h → K bath | Na bath 450° C. 6 h → K bath | Na bath 430° C. 2 h → K bath | Na bath 450° C. 6 h → K bath | Na bath 450° C. 6 h → K bath | Na bath 450° C. 6 h → K bath | Na bath 430° C. 2 h → K bath |

TABLE 2-continued

|  | Example | | | | | | | |
|---|---|---|---|---|---|---|---|---|
| wt % | 9 | 10 | 11 | 12 | 13 | 14 | 15 | 16 |
|  | 480° C. 6 h | 480° C. 6 h | 450° C. 6 h | 430° C. 6 h | 450° C. 6 h | 450° C. 6 h | 450° C. 6 h | 430° C. 2 h |

TABLE 3

|  | Example | | | | | | | |
|---|---|---|---|---|---|---|---|---|
| wt % | 17 | 18 | 19 | 20 | 21 | 22 | 23 | 24 |
| $SiO_2$ | 5.79 | 5.79 | 4.80 | 4.80 | 12.42 | 4.80 | 5.61 | 5.80 |
| $B_2O_3$ | 22.73 | 22.73 | 10.22 | 10.22 | 15.24 | 11.22 | 17.53 | 23.75 |
| $La_2O_3$ | 36.99 | 37.99 | 51.55 | 49.15 | 36.43 | 44.15 | 37.76 | 40.66 |
| $TiO_2$ | 10.38 | 12.38 | 14.35 | 16.35 | 9.49 | 20.35 | 12.08 | 11.39 |
| $Nb_2O_5$ | 7.54 | 7.54 | 7.00 | 7.50 | 4.63 | 7.50 | 12.55 | 10.25 |
| $Li_2O$ | 1.10 | 1.60 | 1.10 | 0.60 | 2.63 | 0.60 | 4.03 | 2.10 |
| $Y_2O_3$ | 6.32 | 5.82 | 3.80 | 4.80 | 7.92 | 4.80 | 3.57 |  |
| $ZrO_2$ | 5.79 | 3.80 | 5.83 | 5.83 | 8.87 | 5.33 | 5.61 | 3.80 |
| $Na_2O$ | 2.00 | 1.00 | 0.50 |  | 1.54 |  | 0.46 | 1.00 |
| $K_2O$ | 0.50 | 0.50 |  |  |  |  |  |  |
| MgO |  |  |  |  |  |  |  |  |
| BaO |  |  |  |  |  |  |  |  |
| ZnO |  |  |  |  |  | 0.50 |  |  |
| $Al_2O_3$ |  |  |  |  |  |  |  |  |
| $WO_3$ | 0.75 | 0.75 | 0.75 | 0.75 | 0.75 | 0.75 | 0.72 | 1.20 |
| $Sb_2O_3$ | 0.10 | 0.10 | 0.10 |  | 0.09 |  | 0.09 | 0.05 |
| TOTAL | 100.00 | 100.00 | 100.00 | 100.00 | 100.00 | 100.00 | 100.00 | 100.00 |
| $Ln_2O_3$ | 43.32 | 43.82 | 55.35 | 53.95 | 44.35 | 48.95 | 41.33 | 40.66 |
| $Rn_2O$ | 3.60 | 3.10 | 1.60 | 0.60 | 4.17 | 0.60 | 4.50 | 3.10 |
| $CaO/Li_2O$ | 0.00 | 0.00 | 0.00 | 0.00 | 0.00 | 0.00 | 0.00 | 0.00 |
| $Ln_2O_3/Li_2O$ | 39.42 | 27.41 | 50.32 | 89.92 | 16.85 | 81.58 | 10.25 | 19.36 |
| $TiO_2/Li_2O$ | 9.45 | 7.74 | 13.05 | 27.25 | 3.60 | 33.92 | 3.00 | 5.42 |
| Refractive index(nd) | 1.839 | 1.853 | 1.977 | 2.001 | 1.835 | 2.013 | 1.893 | 1.852 |
| Abbe number(vd) | 33.70 | 32.40 | 29.20 | 27.86 | 35.30 | 26.00 | 30.60 | 32.00 |
| Specific gravity(ρ) | 4.04 | 4.05 | 4.81 | 4.83 | 4.10 | 4.68 | 4.16 | 4.03 |
| Hv(before) | 769 | 772 | 795 | 816 | 711 | 792 | 760 | 754 |
| Hv(after) | 816 | 830 | 819 | 848 | 785 | 823 | 799 | 789 |
| Hv change rate(%) | 6.0 | 7.4 | 3.0 | 3.9 | 10.4 | 3.9 | 5.1 | 4.6 |
| Chemical strengthening conditons | Na bath 450° C. 2 h → K bath 450° C. 6 h | Na bath 450° C. 2 h → K bath 450° C. 6 h | Na bath 500° C. 6 h → K bath 500° C. 6 h | Na bath 480° C. 6 h → K bath 480° C. 24 h | Na bath 450° C. 6 h → K bath 450° C. 6 h | Na bath 500° C. 6 h → K bath 500° C. 6 h | Na bath 450° C. 6 h → K bath 450° C. 6 h | Na bath 450° C. 6 h → K bath 450° C. 6 h |

TABLE 4

|  | Example | Comparative Example |
|---|---|---|
| wt % | 25 | 1 |
| $SiO_2$ | 6.30 | 26.17 |
| $B_2O_3$ | 9.22 |  |
| $La_2O_3$ | 48.25 |  |
| $TiO_2$ | 17.35 | 5.94 |
| $Nb_2O_5$ | 8.00 | 47.88 |
| $Li_2O$ | 0.90 | 3.87 |
| $Y_2O_3$ | 3.30 |  |
| $ZrO_2$ | 5.83 | 7.08 |
| $Na_2O$ | 0.10 | 8.54 |
| $K_2O$ |  | 0.50 |
| MgO |  |  |
| BaO |  |  |
| ZnO |  |  |
| $Al_2O_3$ |  |  |
| $WO_3$ | 0.75 |  |
| $Sb_2O_3$ |  | 0.018 |
| TOTAL | 100.00 | 100.00 |
| $Ln_2O_3$ | 51.55 |  |
| $Rn_2O$ | 1.00 | 12.910 |
| $CaO/Li_2O$ | 0.00 | 0.00 |
| $Ln_2O_3/Li_2O$ | 57.28 | 0 |
| $TiO_2/Li_2O$ | 19.28 | 1.53 |
| Refractive index(nd) | 2.00 | 1.855 |
| Abbe number(vd) | 27.30 | 24.80 |
| Specific gravity(ρ) | 4.77 | 3.49 |
| Hv(before) | 779 | 695 |
| Hv(after) | 812 | 695 |
| Hv change rate(%) | 4.3 | 0.0 |
| Chemical strengthening conditons | Na bath 500° C. 6 h → K bath 500° C. 6 h | Na bath 450° C. 24 h → K bath 450° C. 24 h |

The results indicated that the chemically strengthened optical glass of the Examples of the present disclosure has a high refractive index and the Hv change rate, which is defined as [(Hvafter−Hvbefore)/Hvbefore]×100, is equal to or greater than 3.0%.

What is claimed is:

1. A chemically strengthened optical glass including a compressive stress layer on a surface,
the chemically strengthened optical glass comprising, by mass % in terms of oxide:
2.0 to 20.0% of a $SiO_2$ component;
5.0 to 35.0% of a $B_2O_3$ component;
20.0 to 60.0% of a $La_2O_3$ component;
2.0 to 25.0% of a $TiO_2$ component;
2.0 to 15.0% of a $Nb_2O_5$ component,
more than 0% and 4.5% or less of a $Li_2O$ component;
wherein the sum of the $Li_2O$ component, a $Na_2O$ component, and a $K_2O$ component is more than 0% and 4.5% or less, and
an Hv change rate defined as [($Hv_{after}$−$Hv_{before}$)/$Hv_{before}$]×100 is equal to or greater than 3.0%.

2. The chemically strengthened optical glass according to claim 1, further comprising:
0 to 15.0% of a $Y_2O_3$ component; and
0 to 15.0% of a $ZrO_2$ component.

3. The chemically strengthened optical glass according to claim 2, having a value of a mass ratio of $CaO/Li_2O$ of 2.0 or less.

4. The chemically strengthened optical glass according to claim 2, having a value of a mass ratio of $Ln_2O_3/Li_2O$ of 2.0 to 200.0.

5. The chemically strengthened optical glass according to claim 2, having a value of a mass ratio of $TiO_2/Li_2O$ of 0.2 to 40.

6. The chemically strengthened optical glass according to claim 2, having a refractive index (nd) of 1.75 to 2.05 and an Abbe number (vd) of 20.0 to 45.0.

7. The chemically strengthened optical glass according to claim 1, having a value of a mass ratio of $CaO/Li_2O$ of 2.0 or less.

8. The chemically strengthened optical glass according to claim 7, having a value of a mass ratio of $Ln_2O_3/Li_2O$ of 2.0 to 200.0.

9. The chemically strengthened optical glass according to claim 7, having a value of a mass ratio of $TiO_2/Li_2O$ of 0.2 to 40.

10. The chemically strengthened optical glass according to claim 7, having a refractive index (nd) of 1.75 to 2.05 and an Abbe number (vd) of 20.0 to 45.0.

11. The chemically strengthened optical glass according to claim 1, having a value of a mass ratio of $Ln_2O_3/Li_2O$ of 2.0 to 200.0.

12. The chemically strengthened optical glass according to claim 11, having a value of a mass ratio of $TiO_2/Li_2O$ of 0.2 to 40.

13. The chemically strengthened optical glass according to claim 11, having a refractive index (nd) of 1.75 to 2.05 and an Abbe number (vd) of 20.0 to 45.0.

14. The chemically strengthened optical glass according to claim 1, having a value of a mass ratio of $TiO_2/Li_2O$ of 0.2 to 40.

15. The chemically strengthened optical glass according to claim 14, having a refractive index (nd) of 1.75 to 2.05 and an Abbe number (vd) of 20.0 to 45.0.

16. The chemically strengthened optical glass according to claim 1, having a refractive index (nd) of 1.75 to 2.05 and an Abbe number (vd) of 20.0 to 45.0.

17. The chemically strengthened optical glass according to claim 1, which comprises 4.63 to 15.0% of a $Nb_2O_5$ component.

* * * * *